United States Patent
Caviezel

(10) Patent No.: US 10,191,298 B2
(45) Date of Patent: Jan. 29, 2019

(54) SPECTACLE BRIDGE ELEMENT AND SPECTACLE FRAME, SPECTACLES OR SPECTACLE SET INCLUDING SPECTACLE BRIDGE ELEMENT

(71) Applicant: Markus Caviezel, Lenzerheide (CH)

(72) Inventor: Markus Caviezel, Lenzerheide (CH)

(73) Assignee: HEMARIS AG, Chur (CH)

( * ) Notice: Subject to any disclaimer, the term of this patent is extended or adjusted under 35 U.S.C. 154(b) by 0 days.

(21) Appl. No.: 14/431,725

(22) PCT Filed: Sep. 28, 2012

(86) PCT No.: PCT/EP2012/069178
§ 371 (c)(1),
(2) Date: Mar. 26, 2015

(87) PCT Pub. No.: WO2014/048484
PCT Pub. Date: Apr. 3, 2014

(65) Prior Publication Data
US 2015/0234202 A1 Aug. 20, 2015

(51) Int. Cl.
*G02C 5/02* (2006.01)
*G02C 5/12* (2006.01)

(52) U.S. Cl.
CPC .............. *G02C 5/02* (2013.01); *G02C 5/12* (2013.01)

(58) Field of Classification Search
CPC . G02C 5/02; G02C 5/126; G02C 5/12; G02C 5/00; G02C 5/122
USPC ......................................... 351/132
See application file for complete search history.

(56) References Cited

U.S. PATENT DOCUMENTS

| 4,304,470 A | 12/1981 | Marly | |
|---|---|---|---|
| 4,787,729 A * | 11/1988 | Ruffen | G02C 5/126 351/131 |
| 4,848,893 A * | 7/1989 | Grendol | G02C 5/12 351/138 |
| 4,861,151 A * | 8/1989 | Negishi | G02C 5/12 351/128 |
| 7,048,371 B1 * | 5/2006 | Moore | G02C 5/00 351/103 |

(Continued)

FOREIGN PATENT DOCUMENTS

| EP | 0171461 A2 | 2/1986 |
|---|---|---|
| EP | 0191887 A2 | 8/1986 |

(Continued)

OTHER PUBLICATIONS

Communication from the European Patent Office in corresponding European Patent Application No. 12770088, dated Nov. 14, 2018.

*Primary Examiner* — William R Alexander
*Assistant Examiner* — Henry Duong
(74) *Attorney, Agent, or Firm* — Baker & Hostetler LLP

(57) ABSTRACT

A spectacle bridge element has a base body for a tool-free exchangeable fastening in a spectacle frame, wherein the bridge element has a nose pad holding structure on which nose pads can be exchangeably mounted. A bridge element set composed of at least one such bridge element and at least one set of nose pads are mountable thereon. A spectacle frame or spectacles using the bridge element as well as a spectacle set containing a spectacle frame or spectacles having at least one bridge element and at least one set of nose pads that can be mounted thereon are provided.

17 Claims, 4 Drawing Sheets

(56) References Cited

U.S. PATENT DOCUMENTS

| | | |
|---|---|---|
| 7,472,991 B1 | 1/2009 | Chen |
| 7,591,555 B1 | 9/2009 | Chen |
| 2008/0170200 A1 | 7/2008 | Chen |
| 2012/0081654 A1 | 4/2012 | Kim et al. |

FOREIGN PATENT DOCUMENTS

| | | |
|---|---|---|
| EP | 2284598 A1 | 2/2011 |
| FR | 1049849 A | 1/1954 |
| WO | 9210778 A1 | 6/1992 |
| WO | 03079096 A1 | 9/2003 |

\* cited by examiner

SPECTACLE BRIDGE ELEMENT AND SPECTACLE FRAME, SPECTACLES OR SPECTACLE SET INCLUDING SPECTACLE BRIDGE ELEMENT

CROSS-REFERENCE TO RELATED APPLICATIONS

This application is a National Stage of International patent application PCT/EP2012/069178, filed on Sep. 28, 2012, the disclosure of which is incorporated by reference in its entirety.

FIELD OF THE DISCLOSURE

The invention relates to a spectacle bridge element as well as to a spectacle bridge element set and a spectacle frame, spectacles or a spectacle set having a spectacle bridge element.

BACKGROUND

Technical solutions allowing the carrier of spectacles to replace the nose pads are known in the prior art.

The utility model document DE 20114296 U1 already shows a spectacle bridge element according to the preamble of claim 1. Furthermore, the US document 2008/0170200 A1 shows a spectacle frame comprising a screwed-on spectacle bridge on which a nose pad holding structure is replaceably mountable.

It is the object of the invention to provide an improved spectacle bridge element which ensures a simple, varied and safe exchangeability of nose pads.

This problem is solved by a spectacle bridge element comprising the features of claim 1. Preferred embodiments are described in the dependent claims.

SUMMARY OF THE DISCLOSURE

The present invention relates to a spectacle bridge element comprising a base body for a tool-free replaceable fixing in a spectacle frame, the spectacle bridge element further having a nose pad holding structure on the base body with nose pads being replaceably mountable thereon.

As the spectacle frame is separated from the nose pads by the spectacle bridge element disposed therebetween, the nose pads can be exchanged in a simpler and safer way. To achieve this, first the spectacle bridge element is taken out of the spectacle frame and only then are the nose pads removed from the spectacle bridge element. In this way, one can exchange the nose pads without having to grip between the side pieces of a spectacle frame, risking a dropping or breaking of the spectacle frame when doing so.

As, basically, only the base body has to remain the same to fit in one and the same spectacle frame, the most diverse nose pad holding structures can be formed on the base body and may, accordingly, accommodate the most various nose pads thereon. This leads to numerous possibilities of adapting the seat of the spectacles to the individual requirements with respect to wearing comfort and stylish appearance. That is, the nose pads can have different colors and/or may vary in softness or hardness. They may be shaped such that they have the least possible contact surface on the nose, e.g. for use at particularly high ambient temperatures at which the spectacle wearer starts sweating quickly. Likewise, they may offer the largest possible contact surface in order to ensure a secure hold during active sports such as skiing or biking, and to distribute forces acting on the spectacles in case of blows or shocks onto the wearer's nose bridge so as to avoid injuries.

Preferably, the nose pads are mountable onto the nose pad holding structure by plugging them on in a plug-on direction.

As the place available on a spectacle bridge is limited, it is desirable to keep the cross-section of the nose pad holding structure as small as possible. In order to nevertheless be able to ensure a safe hold of the nose pads on the nose pad holding structure, plugging the nose pads on is to be preferred to fitting them into the nose pad holding structure. This is due to the greater material strength of the softer nose pad as against the harder nose pad holding structure, and it is also due to the fact that it is easier to plug the softer nose pads onto the harder nose pad holding structure than inserting them into the same, as the soft nose pads might spread and get wedged in the nose pad holding structure if they were inserted.

Preferably, the plug-on direction of the nose pads onto the nose-pad holding structure is different from an insertion direction of the base body into a spectacle frame.

Further, the plug-on direction being different from the insertion direction contributes to the safe hold, because a force which is exerted onto the nose pads in a direction opposite to the plug-on direction, e.g. when the nose pads are replaced while the base body is still in the frame, does not necessarily lead to the entire nose bridge element being drawn from the spectacle frame in the opposite insertion direction. In this way, the nose pads can also be exchanged directly on the spectacle frame.

Preferably, the nose pad holding structure is capable of holding nose pads on its outer periphery.

As has already been mentioned, this serves to achieve a safe hold of the nose pads on the nose pad structure although the cross-section of the nose pad holding structure is small. Additionally, signs of wear such as e.g. cracks can be well recognized on the nose pads which are mostly softer. These cracks may be produced by environmental influences, e.g. rapid temperature changes and UV radiation and/or by a bending of the nose pads occurring, when the spectacles are worn, in the transitional area to the nose pad holding structure on the outer periphery of the nose pads, i.e. the drawing side. These cracks are particularly easy to recognize in that, when the nose pads are plugged onto the nose pad holding structure, the nose pads undergo a basic elongation adapted to facilitate the recognition of cracks. If the nose pads were inserted into the nose pad holding structure, the nose pad holding structure could hide these cracks and impede a timely recognition and replacement of worn nose pads.

In a preferred embodiment, a nose pad holding structure comprises two nose pad arms symmetrically arranged to a spectacle center or, rather, the center of a nose bridge. The nose pad arms are used for holding the nose pads and, together with the nose pads, support the spectacle frame in the correct position with respect to the eyes.

It is preferred that the cross-section of the nose pad arms is uniform over their lengths as to shape and/or diameter. In this way, the nose pads can be shifted or mounted over almost the entire length of the nose pad arms.

Preferably, the nose pad arms can be shortened and/or can, if required, be molded under the influence of heat. In this way, the spectacle frame can be individually adjusted on the wearer's nose. Even if, inadvertently, the nose pad arms were excessively shortened or cut off, the nose bridge element can be replaced, instead of the whole spectacle frame.

In a further preferred embodiment, the nose pad holding structure comprises, on the base body, at least one projection having an undercut, while a nose pad as a whole in the form of a nose pad pair element can be plugged onto the nose pad holding structure.

Due to this undercut, a nose pad can be simply plugged on, safely fastened and replaced with other nose pads. For hygienic reasons, a nose pad may be designed such that it cannot be replaced without being destroyed, i.e. it may, for example, be deformed such that, once removed, a fresh plugging-on of the same nose pad is not possible.

The nose pad is preferably manufactured of a wire which is essentially over-molded with plastic. Thereby the flexibility and, thus, the resilience of the wire combined therewith can be made use of when the nose pad is plugged onto and off the nose pad holding structure. Such a nose pad has a plug-on section on which two wire portions extend essentially in parallel to each other. The wire portions can be spaced apart from each other under a preload, so that, between them, the projection can be inserted up to the undercut. Subsequently, the pre-load is released and the two wire portions engage in a form-fit manner in the undercut and hold the nose pad therein.

According to the invention, what is provided is a nose bridge element set consisting of at least one of the above-described bridge elements and at least one set of nose pads mountable thereon.

According to the invention, a spectacle frame or spectacles using an above-described bridge element is/are provided.

According to the invention, a spectacle set is provided; it contains a spectacle frame or spectacles having at least one of the above-described bridge elements and at least one set of nose pads mountable thereon.

Further features and properties of the present invention are described in the embodiments below.

DETAILED DESCRIPTION

Figure 1:
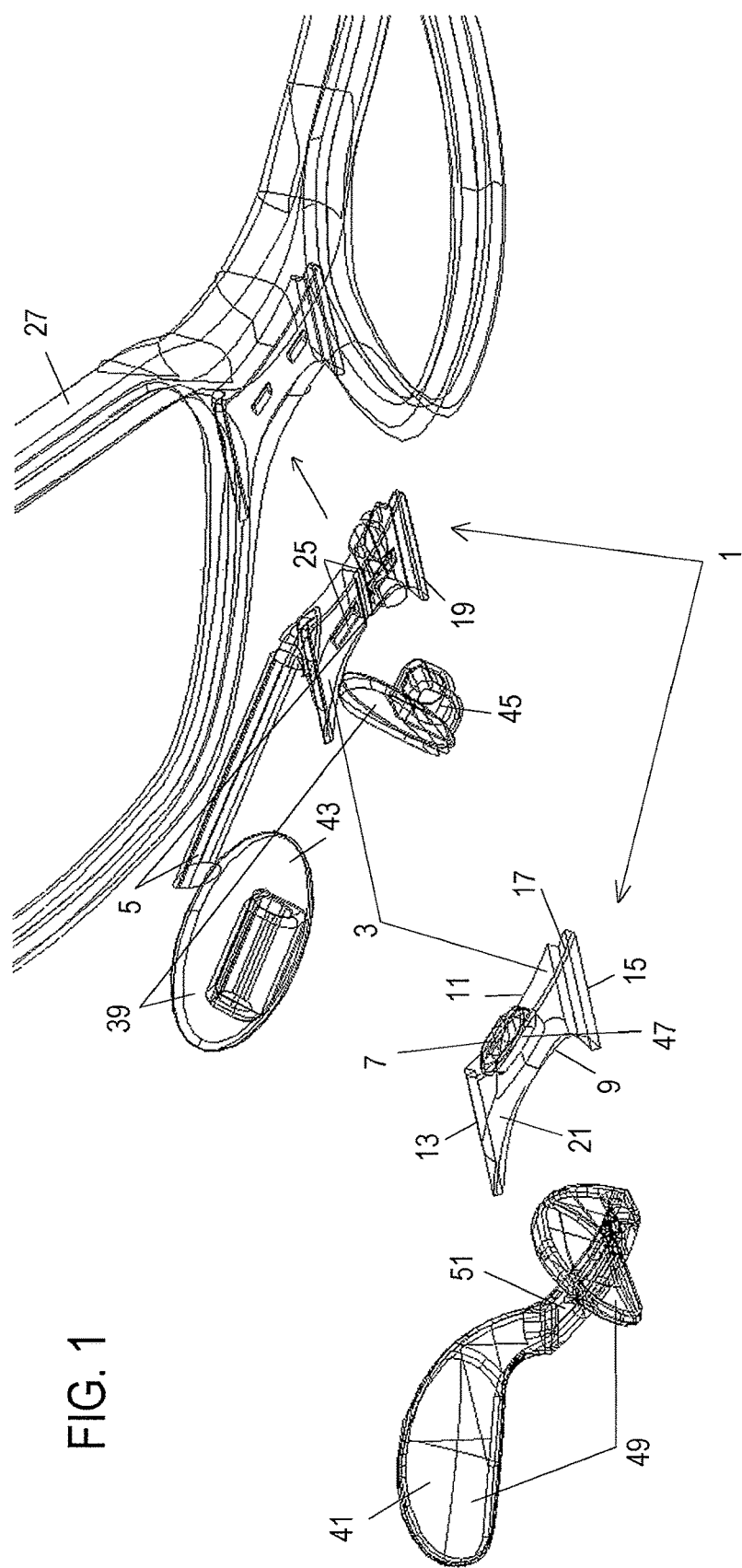
FIG. 1 shows a three-dimensional rear view of a spectacle frame (facing a spectacle wearer) including two embodiments of a bridge element and the fitting nose pads.
Figure 3:
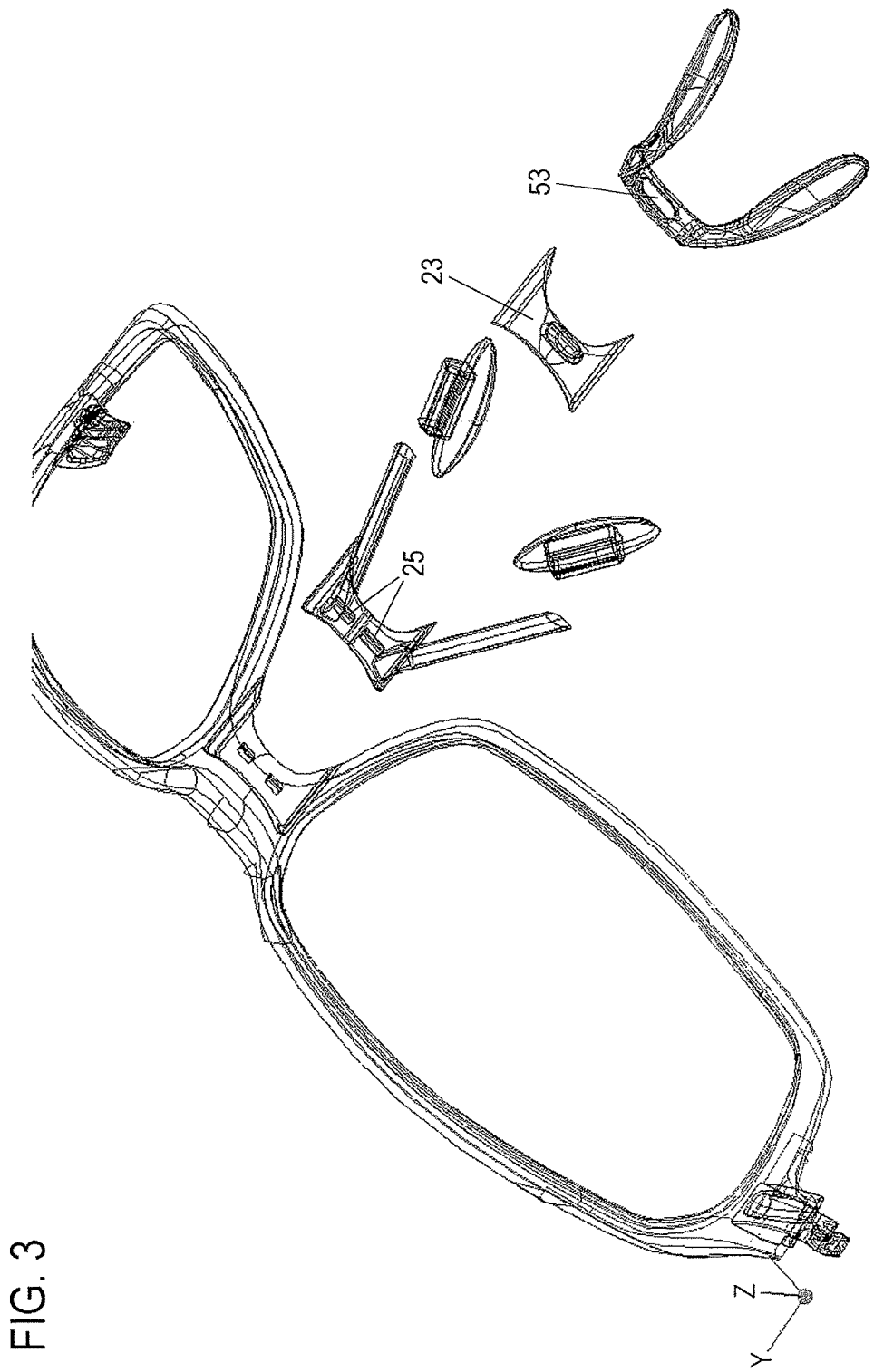
FIG. 3 shows a three-dimensional front view of the spectacle frame (facing away from a spectacle wearer) including the two embodiments of a bridge element and the fitting nose pads from FIG. 1.
Figure 4:
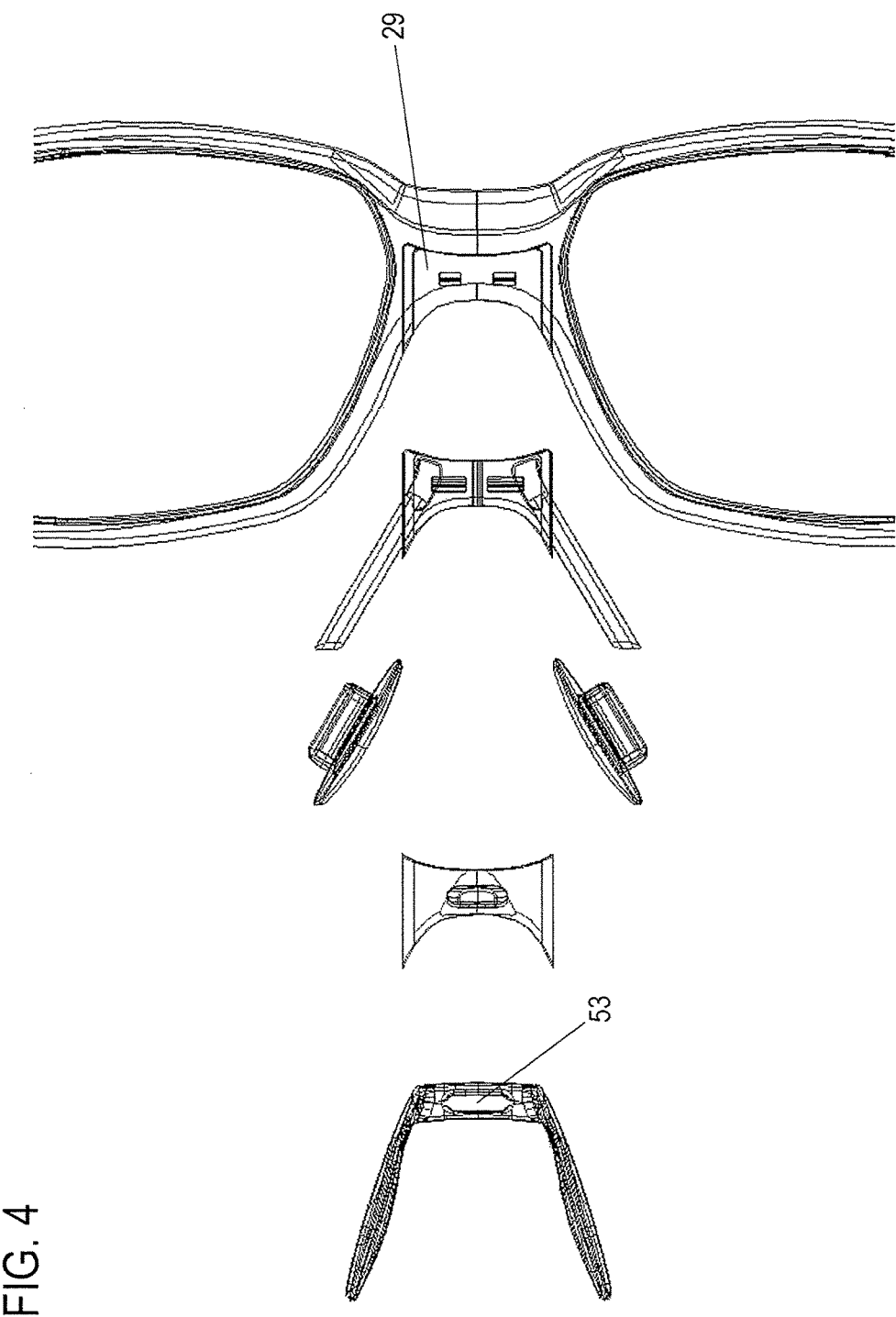
FIG. 4 shows the front view from FIG. 1 as direct top view.

FIGS. 1, 3 and 4 show two embodiments of a symmetrical bridge element 1 according to claim 1. In both embodiments, the spectacle bridge element 1 is composed of a base body 3 and a nose pad holding structure 5, 7. The two embodiments only differ as regards the nose pad holding structure 5, 7, which shall be dealt with in detail below in the respective embodiments. First of all, the respectively same base body 3 shall be described.

Figure 2:
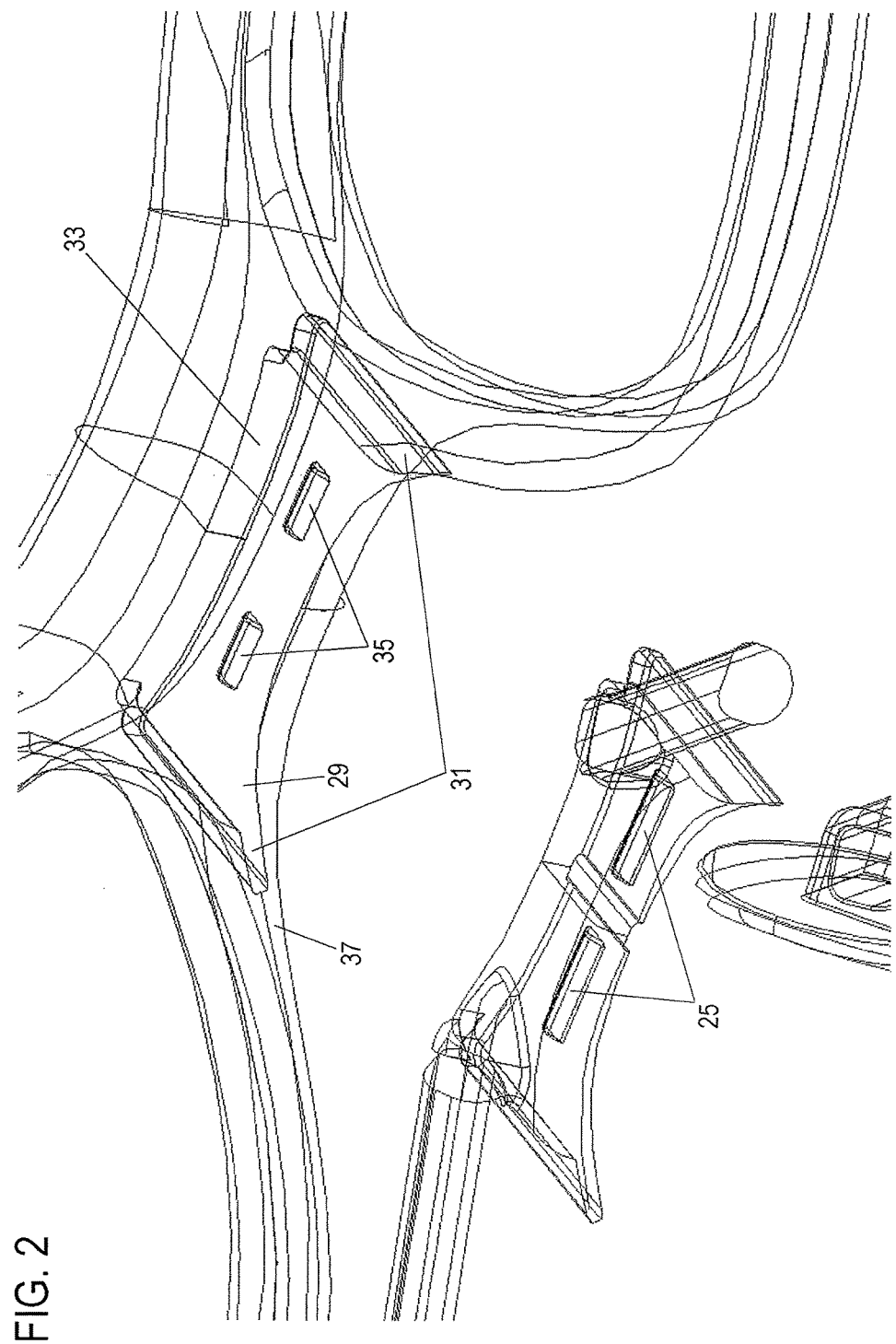
FIG. 2 shows a detail view from FIG. 1.

The base body 3 is composed of a small plastic plate 3 having two opposite concave edge areas or edges 9, 11 as well as two edge areas or edges 13, 15 which are parallel to each other. The center between the two parallel edges 13, 15 is the bridge element center with respect to which the bridge element is symmetrical. The small plate 3 has stepped sections 17 on its parallel edges 13, 15 so as to produce guiding or retaining rails 19. Due to the stepped sections 17, two differently large areas 21, 23 (FIG. 3) are produced on the small plate. The upper surface 21 is visible in FIGS. 1 and 2 and faces the upper margin of the Figure. The lower surface 23 is visible in FIGS. 3 and 4 and, in FIG. 3, faces the upper margin of the Figure and, in FIG. 4, the viewer of FIG. 4. Two engaging recesses 25 are in the lower surface 23 (FIG. 2) and extend symmetrically between the two parallel edges 13, 15 of the small plate. On the upper surface 21, the nose pad holding structure 5, 7 projects from the small plate 3.

On the nose bridge on the rear side of the spectacle frame 27, a spectacle frame 27 fitting this base body 3 or fitting spectacles 27 has/have a recess 29 which is adapted to the base body 3 (FIG. 2) and which is open downwards, i.e. in the direction of the wearer's nose or to the left margin of FIG. 4. For the assembly of the base body 3, the guiding or retaining rails 19 of the base body 3 can be inserted into corresponding guiding or retaining grooves 31 in the spectacle frame 27 until the one concave rim 11 of the small plate 3 touches a correspondingly convex stop 33 in the spectacle frame 27. In this procedure, the small plate 3 is pushed over snap-in knobs 35, which are arranged centrally in the recess 29 away from the guiding or retaining grooves 31 and which engage in the snap-in recesses 25 and secure the small plate 3 against slipping out. At its other concave edge 9, the base body 3 closes flush with the rim 37 of the spectacle frame 27 as soon as the base body 3 has been completely inserted into the recess 29 of the spectacle frame 27. It is only the nose pad holding structure 5, 7 that projects from the rear side of the spectacle frame 27.

Two snap-in recesses 25 and snap-in knobs 35 are provided, respectively, in order to still ensure a safe fixing of the bridge element 1 in the spectacle frame 27, even if one of the snap-in recesses 25 or snap-in knobs 35 was worn or damaged.

Preferably, the snap-in knobs 35 are provided as projections on the guiding or retaining rails 19 (not represented), so that the snap-in knobs engage with the corresponding snap-in recesses in the guiding or retaining grooves 31. The analogously reverse arrangement is also possible. In this way, no additional machining of the lower surface 23 of the small plate 3 and no provision of snap-in knobs 35 in the recess 29 in the spectacle frame 27, which would affect the thickness of the spectacle frame 27, would be required.

In the two embodiments below, two different nose pad holding structures 5, 7 and the fitting nose pads 39, 41 are described.

First Embodiment

In FIGS. 1 to 4, the first embodiment of a bridge element 1 including the fitting nose pads 39 is shown to be closest to the spectacle frame 27 in the positionally shifted exploded view. The nose pad holding structure 5 extends from the base body in the form of two nose pad arms 5, which extend at an oblique angle away from each other in a direction opposite to the insertion direction of the base body 3 into the spectacle frame 27. The nose pad arms 5 have an approximately cylindrical cross-section. The nose pads 39 are plugged onto the ends of the nose pad arms 5. The nose pads 39 are small oval plastic plates 43, which are made of a softer plastic material than the base body 3 and/or the nose pad holding structure 5. Each of the nose pads 39 has a loop-shaped extension 45 adapted to house the nose pad arm 5 assigned thereto. Said nose pad 39 is pivotable about the nose pad arm 5.

The comparably firm hold of the nose pad 39 on the nose pad arm 5 is preferably reinforced by gluing of their contact surfaces.

Preferably, a firm hold with/without the use of glue is reached by roughening the nose pad arms 5 and the interior of the loop extension 45 of the nose pads 39.

Preferably, a stepwise engaging plug-on of the nose pads 5 on the nose pad arms 5 is reached by an annular roughening of the nose pad arms 5 and of the interior of the loop extension 45 of the nose pads 39.

Second Embodiment

In FIGS. 1, 3 and 4, the second embodiment of a bridge element 1 including the fitting nose pads 41 is shown to be further away from the spectacle frame 27 in the positionally shifted exploded view. The nose pad holding structure 7 is a projection 7 projecting perpendicularly from the base body 3. The projection 7 has an essentially oval cross-section and a circumferential undercut 47 in the vicinity of the base body 3. A nose pad 41 is held in said undercut 47, which as in the first embodiment is made of a softer plastic material and can therefore be removed in a non-destructive manner. The nose pad 41 is plugged on over the wider projection 7 up to the undercut 47. The nose pad 41 has two nose pad wings 49, which are connected at an obtuse angle by means of a connecting bar. A continuous cut-out 53, which basically corresponds to the contours of the undercut 47 of the projection 7, is in the center of the connecting bar 51.

Preferably, the nose pad 41 is made of a wire overmolded with plastic, said wire also allowing a plug-on due to its flexibility.

The bridge element 1 described in the embodiments is preferably part of a bridge element set, together with at least one nose pad 39, 41 mountable thereon.

The bridge element 1 described in the embodiments is preferably part of a spectacle frame 27 or of spectacles 27. This shall include all types of spectacles, particularly sports glasses.

The bridge element 1 described in the embodiments is preferably provided as part of a spectacle set containing a spectacle frame 27 or spectacles 27 having at least one of the bridge elements 1 and at least one set of nose pads 39, 41 mountable thereon.

The invention claimed is:

1. A spectacle bridge element having a base body for a tool-free exchangeable fastening in a spectacle frame, and
 a nose pad holding structure on the base body, on which nose pads are exchangeably mountable,
 wherein
 the base body is composed of a plastic plate which has two parallel edges having stepped sections thereon that define guiding or retaining rails, which are configured to be inserted into a pair of corresponding guiding or retaining grooves in the spectacle frame, by means of which the base body can be completely inserted into a recess of the spectacle frame while closing flush with an edge of the spectacle frame in an inserting direction of the base body so that the base body lies completely within the spectacle frame in the inserting direction and only the nose pad holding structure projects from a rear side of the spectacle frame.

2. The spectacle bridge element according to claim 1, wherein nose pads are mountable by being plugged onto the nose pad holding structure, and
 the plug-on direction of the nose pads onto the nose pad holding structure is different from an insertion direction of the base body in a spectacle frame.

3. The spectacle bridge element according to claim 1, wherein
 the nose pad holding structure is capable of holding nose pads on its outer periphery.

4. The spectacle bridge element according to claim 1, wherein
 the nose pad holding structure comprises two symmetrically arranged nose pad arms.

5. The spectacle bridge element according to claim 4, wherein
 the cross-section of the nose pad arms is essentially uniform over their lengths as regards shape and/or diameter.

6. The spectacle bridge element according to claim 4, wherein
 the nose pad arms can be shortened and/or deformed under the influence of heat.

7. The spectacle bridge element according to claim 1, wherein
 the nose pad holding structure comprises a one-sidedly arranged projection having an undercut onto which an integral nose pad pair element can be plugged.

8. A spectacle bridge element set composed of at least one bridge element according to claim 1 and at least one set of nose pads mountable thereon.

9. A spectacle frame or spectacles using a bridge element according to claim 1.

10. A spectacle set containing a spectacle frame or spectacles comprising at least one bridge element according to claim 1 and at least one set of nose pads mountable thereon.

11. The spectacle bridge element according to claim 1, wherein the nose pad holding structure comprises a projection projecting perpendicularly from the base body.

12. The spectacle bridge element according to claim 11, wherein the projection includes a circumferential undercut configured to receive the nose pad.

13. The spectacle bridge element according to claim 1, wherein the base body comprises a concave edge configured to close flush with a rim of the spectacle frame when the base body is completely inserted into the recess of the spectacle frame.

14. The spectacle bridge element according to claim 1, wherein the base body further comprises oppositely spaced apart concave edges.

15. The spectacle bridge element according to claim 14, wherein the guiding or retaining rails of the base body are configured to be inserted into the pair of corresponding guiding or retaining grooves in the spectacle frame until one of the concave edges of the plate touches a correspondingly convex stop in the spectacle frame.

16. The spectacle bridge element according to claim 1, wherein the recess of the spectacle frame is correspondingly adapted to fit the plate of the base body and is open downwards in the direction of a user's nose.

17. A spectacle bridge element for a spectacle frame, the spectacle bridge element comprising:
 a base body configured to be replaceably fixed in the spectacle frame, the base body comprising a plate having two oppositely spaced apart concave edges, two oppositely spaced apart parallel edges, and a bridge element center disposed between the two parallel edges, the two parallel edges having stepped sections thereon that define guiding or retaining rails configured to be inserted into a pair of corresponding guiding or retaining grooves in the spectacle frame, and a nose pad holding structure on the base body, the nose pad holding structure having a nose pad replaceably mounted thereon, wherein the guiding or retaining rails of the base body are configured to be inserted into the corresponding guiding or retaining grooves in the spectacle frame until a first of the two concave edges of the plate touches a correspondingly convex stop in the spectacle frame, and wherein a second of the two concave edges of the base body is configured to close flush with a rim of the spectacle frame in an inserting direction of the base body when the plate is completely inserted into a recess of the spectacle frame in the inserting direction.

* * * * *